Feb. 25, 1930.  G. C. JETT  1,748,571
DRIVING SPROCKET MOUNT
Filed Dec. 9, 1926  5 Sheets-Sheet 4
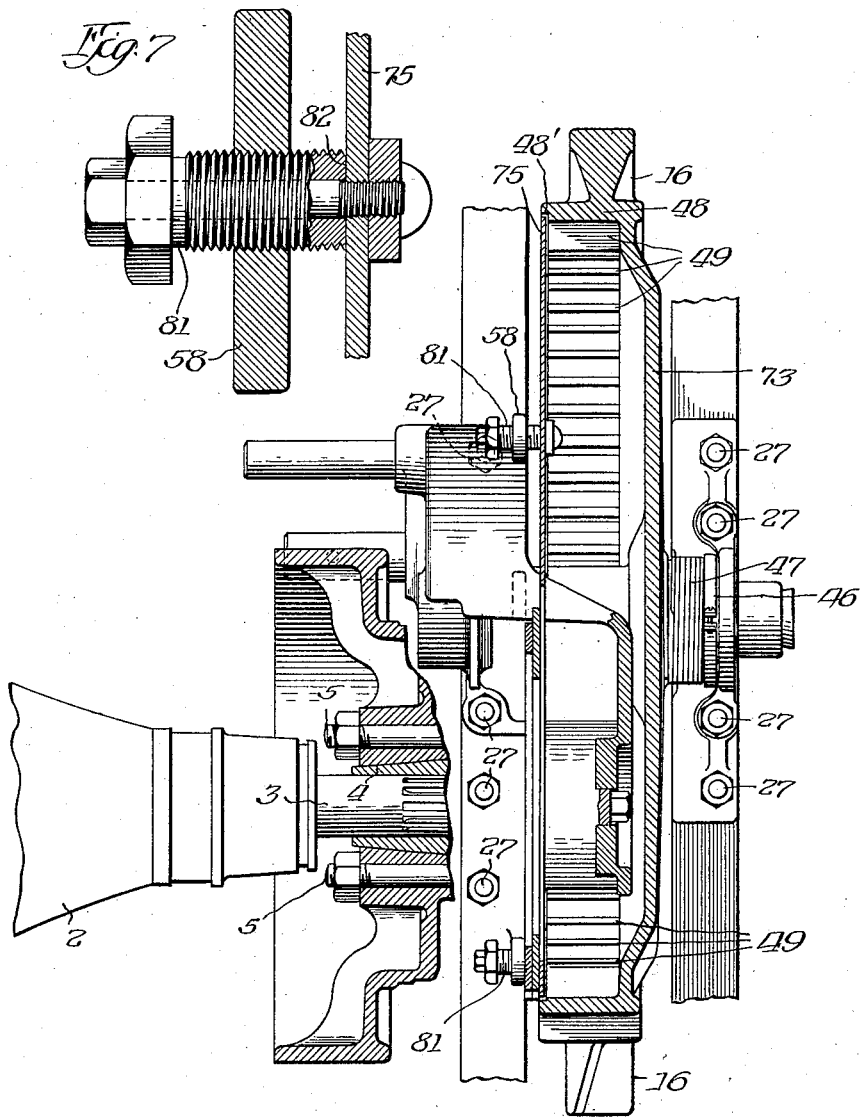

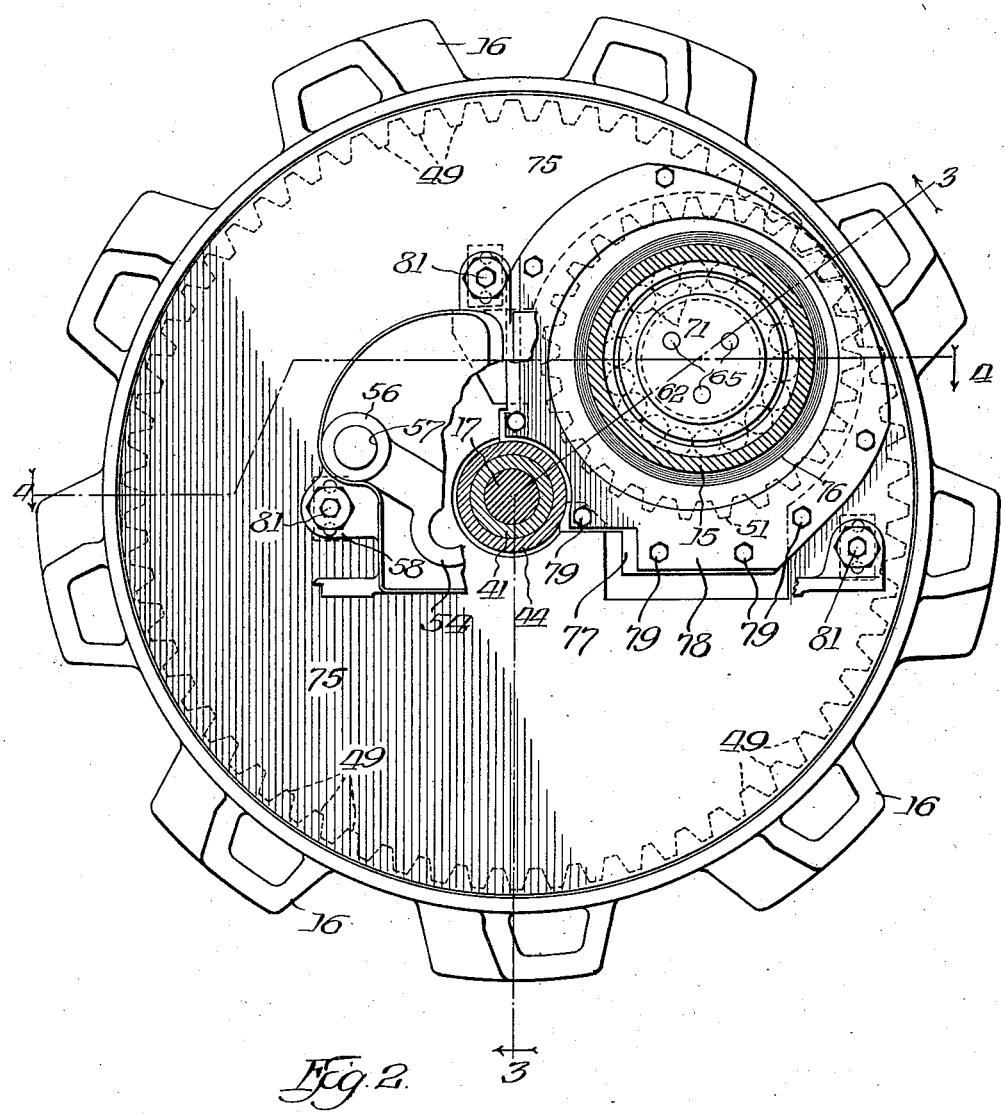

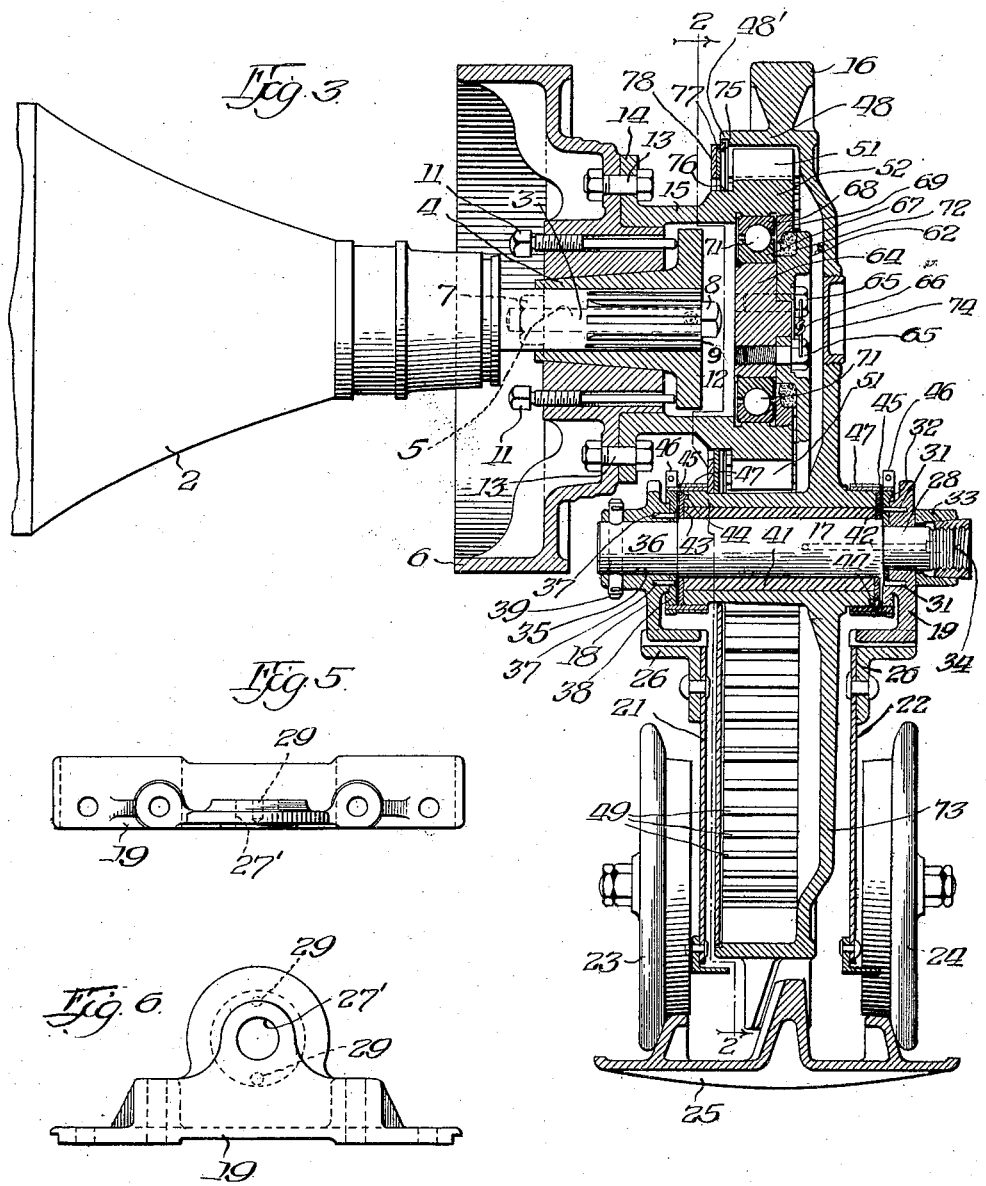

Feb. 25, 1930. G. C. JETT 1,748,571
DRIVING SPROCKET MOUNT
Filed Dec. 9, 1926 5 Sheets-Sheet 5
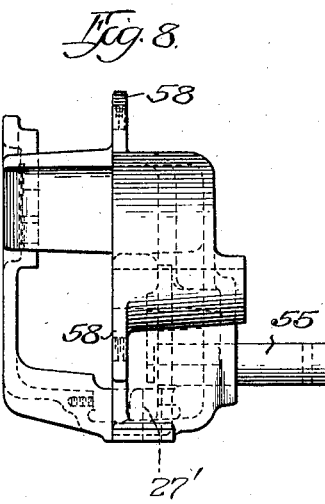
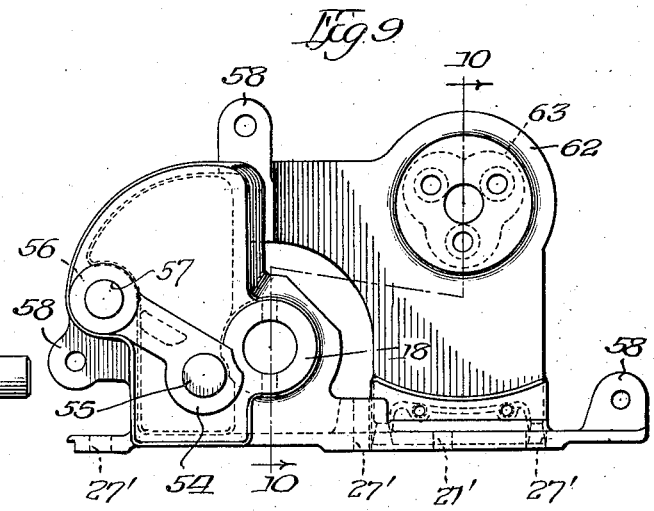
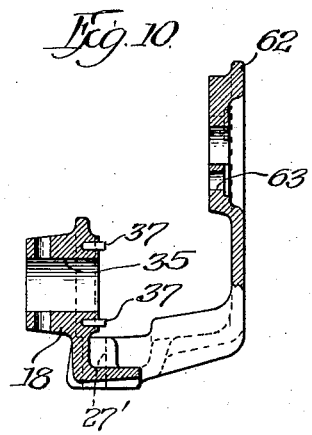
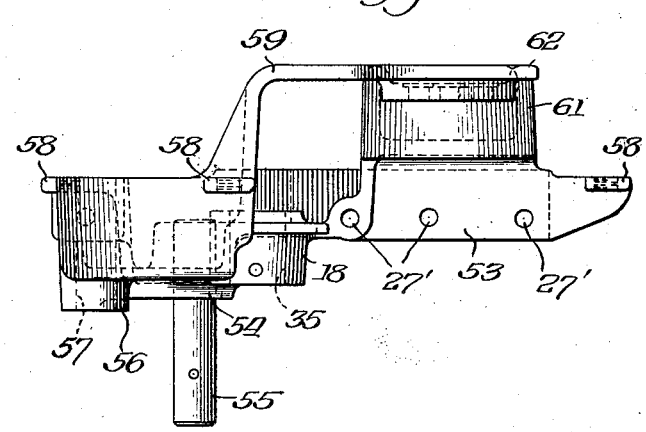
Inventor
George C. Jett,
By Ira Wilson
Atty.

Patented Feb. 25, 1930

1,748,571

UNITED STATES PATENT OFFICE

GEORGE C. JETT, OF MILWAUKEE, WISCONSIN, ASSIGNOR OF TWO-FIFTHS TO WALTER H. STIEMKE, OF MILWAUKEE, WISCONSIN

DRIVING-SPROCKET MOUNT

Application filed December 9, 1926. Serial No. 153,540.

The invention hereinafter more fully disclosed relates to a vehicle driving mechanism and more particularly to a mounting and driving arrangement for round wheel tractors with which it is desired to obtain a comparatively high tractive effort for the rate of speel of travel. The embodiment of the invention chosen for illustration in connection herewith is a tractor construction of the creeper type utilizing driving sprockets over which suitable chain treads are arranged for driving and/or steering the tractor.

A creeper-type tractor is capable of delivering a greater relative proportion of its total machine weight in drawbar pull than a round wheel tractor with the same engine power and under certain favorable soil conditions a creeper-type tractor will deliver, before slipping, as much as two times the drawbar pull of a round wheel tractor of equal weight. It therefore follows that the efficiency in useful drawbar pull in ratio to the engine power is greater in the creeper-type tractor than can be attained with a round wheel-type tractor. A creeper-type tractor will successfully travel and deliver a good proportion of its engine power in drawbar pull under soil conditions so adverse that a round wheel tractor would do little or nothing or perhaps become mired.

Certain manufacturers of tractors build the power plant transmission and tractor body substantially as a unit and equip the fore and rear axles with ordinary round wheels on the rims of which cleats or other anti-slipping devices are provided but make no provision for substituting a creeper or chain or link tread tractor mechanism in place of the wheels for converting the wheel-type tractor into a creeper type. However, as it is very often desirable to replace the ordinary round wheels of a tractor with sprocket wheels and link or chain treads for certain classes of work and to cope with certain conditions often encountered, such as those above mentioned, special mechanisms or adapters must be devised before the tractors can be made convertible.

According to the present invention I am able to convert round wheel tractors of various types into creeper tractors while using the same engine, clutch, transmission, etc. up to the final drive without in any wise changing the capacity of these units and make large capacity tractors out of smaller tractors; that is, considering the capacity of a tractor as the capacity at its drawbar. Stating the matter in a different way, I greatly increase the drawbar pull in pounds per engine horse power which decreases the power loss and decreases the first cost of the power plant unit and the fuel cost for operation besides attaining many other desirable qualities and advantages, as will be apparent.

Accordingly one of the primary objects of the invention is to provide a suitable mechanism strong and rugged in character for converting an ordinary round wheel tractor into a creeper tractor without decreasing the tractor's efficiency, but on the contrary, increasing it.

Another object is to provide a final drive gear reduction from the live axle of the tractor or like vehicle which may be readily connected in place of the ordinary drive wheel of a round wheel tractor and one which is simple in construction and arrangement.

Another object is to provide a novel gear connection between the live axle of a tractor or other similar vehicle and the driving wheel or driving sprocket together with a normal bearing support for a part of the gearing.

In this connection certain of the parts are made adjustable as well as removable for replacement or otherwise for the purposes which will be more clearly apparent hereafter.

A further object is to provide a novel construction of a creeper sprocket, its mounting and arrangement separately from and in conjunction with the means for driving it from the live axle.

A still further object is to provide novel means for cooperative arrangement in connection with the driving sprocket and its driving means whereby dust, dirt and other débris to which the mechanism might otherwise be subjected or through which the tractor may travel will not obtain access to the gearing and bearings.

Many further objects including a novel form of thrust bearing for the driving sprocket, the details of construction and the arrangement of the parts will be or should become readily appreciated after perusal of the following description and claims taken in connection with the drawings in which:

Fig. 2 is a view similar to that of Fig. 1 but to the rear thereof along the line 2—2 of Fig. 3, showing certain parts broken away.

Fig. 3 is a sectional view taken substantially along the line 3—3 of Fig. 2.

Fig. 4 is a plan sectional view taken substantially along the line 4—4 of Fig. 2.

Figs. 5 and 6 are top plan and side elevational views respectively of the outside bearing support or bracket for the sprocket axle.

Figure 1:
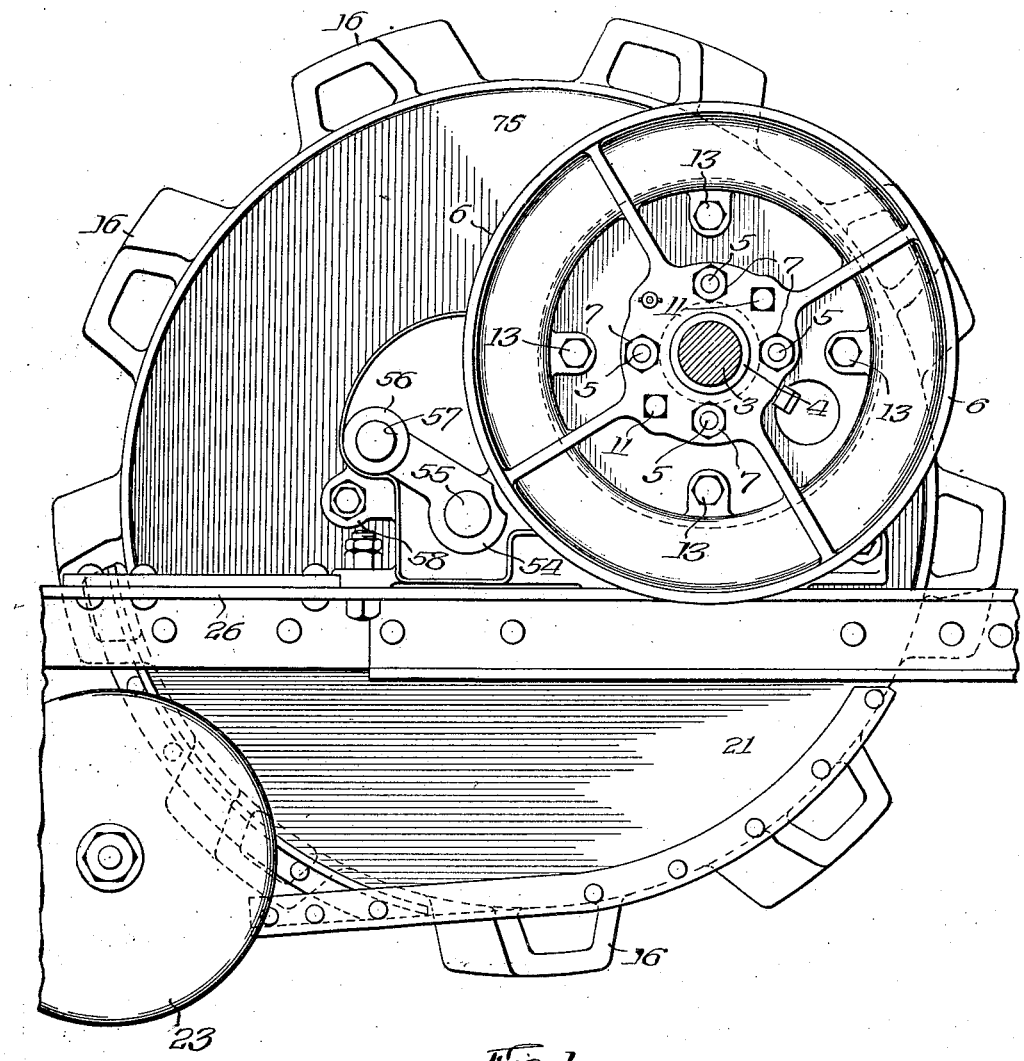
Fig. 1 is an interior side elevational view of one form of the invention.

Fig. 7 is a detail of one of the adjusting screws for holding the dust covers and plates in position, and Figs. 8, 9, 10 and 11 are views of the combination inside bearing support or bracket for the driving sprocket and outboard bearing support for the pinion affording driving connection between the live axle and the sprocket; Fig. 8 being an end elevation of this member; Fig. 9 a side elevation; Fig. 10 a section taken substantially along the line 10—10 of Fig. 9. and Fig. 11 a top plan view.

Shown only in Figs. 3 and 4 is an ordinary tractor live axle and differential housing 2 from which the axle 3 is shown projecting. Ordinarily the driving wheel of a round wheel tractor is mounted directly on the axle 3 and commonly held in place thereon by means of a tapered and split wheel bushing, generally designated 4, the taper of the bushing cooperating with an oppositely tapered bore in the hub of the wheel for clamping the bushing tightly to the splined shaft when the bushing and hub are moved relatively to one another as by means of bolts, such as bolts designated 5. The manner of clamping the wheel to the axle will be obvious.

In applying the invention to an ordinary round wheel tractor, such as the Fordson tractor, I prefer to substitute a brake drum 6 in place of the driving wheel and secure the drum to the axle with the same or a similar bushing 4, the bolts 5, in this instance, passing through the bushing from the end of the axle toward the differential and brake drum and through the brake drum where they receive nuts 7 for clamping the drum in place and tightly against rotation relative to the axle. The brake drum 6 is for both braking and steering purposes. In order to prevent the bolts 5 from rotating when the nuts 7 are being tightened, owing, as will later be apparent, to the inaccessibility of the heads of the bolts, each is pinned, as shown at 9, to the bushing 4.

The brake drum 6 is drilled and tapped at diametrically opposite places in its hub to receive set screws 11 which at their inner ends bear against the inner face of a flange 12 formed on the bushing 4 in order to afford means for adjusting the position of the brake drum and pinion assembly on the axle 3 in a free and uncramped running position. The web of the brake drum is also drilled at suitable places, preferably four, for the reception of bolts 13 which serve to secure a flange 14 of a sleeve pinion, generally designated 15, thereto. Consequently any driving movement of the brake drum relatively to the axle 3 will likewise drive the pinion.

The driving sprocket wheel, generally designated 16, is preferably mounted on an axle, generally designated 17, in turn supported and secured in suitable brackets or supports, generally designated 18 and 19, which are in their turn secured to and supported by side frame members 21 and 22 respectively. These frame members 21 and 22 are similar to those described and claimed in my copending application Serial No. 590,848, filed September 27, 1922, and as shown therein extend in spaced relation longitudinally of the tractor. Flanged creeper truck wheels 23 and 24 are rotatably secured to the frame at spaced intervals for supporting the weight of the tractor on the links 25 of a chain tread and for guiding the links in their travel between the driving and driven sprockets, as will be understood.

Each frame member 22 is preferably provided with an angle iron 26 adjacent and extending longitudinally along the upper edge thereof and it is upon these angle irons that the interior and exterior brackets 18 and 19 are secured as by bolts 27. The bracket 19 is shown in detail in Figs. 5 and 6 from which it will be seen that it is drilled, as at 27', to receive the exterior reduced end 28 of the axle and also on its interior side, as shown at 29, for the reception of one or more dowel pins 31 which serve to secure a thrust washer 32 thereto. The exterior side of the bearing bracket 19 is preferably provided with a flat face circumferentially of the axle opening 27 for the reception of a suitable lock nut 33 which houses a suitable lubricant connection 34 and secures the axle and bracket tightly together. The bracket 18 is likewise drilled, as at 35, for the reception of the reduced end 36 of the axle 17 and with dowel pin openings for the reception of dowel pins 37 which serve to secure an inside thrust washer 38 thereto. In order to hold the axle 17 against rotation in the brackets and therefore against rotation relative to the frame members 21 and 22 the axle is pinned to the bracket 18 by a pin 39 which passes through the bracket and axle and is suitably cottered in place.

The sprocket wheel 16 is provided with a bronze or other suitable bushing 41 which is secured within the hub of the wheel in any suitable manner, while thrust bearing washers 42 and 43 are secured by means of projections 44 against the ends of the hub for cooperative engagement with thrust bearing washers 32 and 38 respectively. In order to keep the sprocket wheel journal thus constituted free from dust, dirt, etc. which might creep in between the thrust washers at either end of the axle, a leather dust or packing sleeve 45 is placed about each end of the hub and clamped to the thrust washers 32 and 38 by means of ring clamps 46. The inner ends of these leather packing sleeves or dust guards are held tightly against the hub by means of a coiled spring 47. This affords very substantial protection for the sprocket journal.

The sprocket wheel 16 is provided with a flanged periphery 48 which has an internal ring gear, the teeth of which are indicated at 49, formed integrally therewith on the internal side thereof for meshing with corresponding teeth 51 formed on the pinion 15 which is provided with a portion 52 projecting beyond the end of the axle 3 of the ordinary round wheel tractor. Since this overhanging portion of the pinion 15 must withstand not only the gear tooth load but the tractor load and indeterminate stresses induced through and by the brake drum, it is essential that the pinion be strong and rigid in construction and be very carefully and firmly supported. The manner of supporting this pinion will now be described.

The bracket or support 18 forms one portion of and is integral with an outboard bearing support shown in detail in Figs. 8 to 11 inclusive. Referring for the moment to these figures, it will be noted that the single casting has a bottom flanged portion 53 through which bolt holes 27' are provided for reception of bolts 27 which secure this bracket and outboard bearing member to the inside frame angle member 26, with a hub 54 in which a pin or axle 55, which serves as a brake stud shaft, is secured in any suitable manner, a hub 56 which is drilled as at 57 for the reception of a brake lever pin (not shown), with drilled and tapped lugs 58, the purpose of which will hereinafter be described, and with two arms 59 and 61 which extend outwardly and upwardly with respect to the axle to a point of intersection in front of the opening in the outer end of the pinion where they are integrally joined together to form a head, generally designated 62. This head 62 is suitably drilled, as at 63, and machined for the reception of a ball bearing retainer 64 adapted to be held in place therein by cap screws 65 or the like which are afterwards locked by a wire 66 or in any other suitable manner. The ball bearing retainer 64 securely supports a ball raceway 67 between which and a raceway 68, secured in the end portion 52 of the pinion by a ball retainer ring 69, a plurality of balls 71 are held. A suitable space is left between the head 62 and the ball retainer ring 69 for packing 72 which serves to prevent any dust or dirt from getting into the raceway and which may in addition serve to hold a lubricant. The web 73 of the sprocket 16 is provided with a pipe plug 74 for the purpose of rendering the stud bolts 65 and the outboard bearing accessible for connection for removal and repair.

It will be apparent that this outboard bearing support is of peculiarly novel construction and affords a very substantial support for the pinion gear within a very cramped and necessarily narrow space. The construction is compact and simple and very strong and the several parts are easily accessible for any purpose. One of the greatest difficulties that must be encountered with the construction of the character thus far described, is that of keeping dust and dirt or other débris from getting into the gear teeth and bearings. This difficulty I have entirely overcome in a peculiar manner which will now be described.

The gears and outboard bearing are fully protected from the exterior side of the tractor by the web 73 of the sprocket wheel which is purposely made continuous circumferentially and radially of the hub and rim. The inner and open side, however, presents quite a different and very difficult problem because of the limited space available and the relatively high peripheral speed of the sprocket wheel and gear 51. The junction between the stationary guard 75 and the peripheral edge of the flange of the sprocket wheel cannot be lubricated although these surfaces must be as close as possible without touching when running at high velocity and this guard must have an opening large enough to receive the pinion 15, as well as such portions of the outboard bearing bracket as pass therethrough. The pinion 15 is accordingly provided with a turned periphery 76 over which a leather guard or washer 77 is tightly fitted. The stationary dust cover plate 75 is assembled in place over the hub of the sprocket wheel and the leather guard or washer over the turned surface 76, while behind these a guard plate 78 is slid over the finished surface 76 and secured to the plate 75 by means of a plurality of cap screws 79, as will be apparent. The plate 75 is adjustably secured to the outboard bearing bracket by three adjustment screws 81 which for this purpose pass through the tapped lugs 58 of the bracket, their rear ends 82 providing an adjustable abutment for the plate 75. A detail of one of these screws is shown in Fig. 7. This adjustable three-point suspension of the plate 75 and consequently of the leather dust guard 77 and guard plate 79, since they are attached together, permits a nice adjustment of the dust cover plate 75 with respect to a groove 48′ provided in the periphery 48 of the sprocket, as well as adjustment with respect to the pinion.

By supporting the pinion at its outer end in the above described manner the weight of the tractor, any and all loads superimposed upon or drawn by it and various stresses which otherwise might fall upon the driving axle or its housing are transmitted through the driving sprocket axle, the frame in or on which it is mounted and to the chain tread and ground where they are absorbed. The arrangement is also such as to carry the load equally on the various parts which compose the side frame members and to distribute it symmetrically with respect to the sprocket and its axle; in other words, the various loads which may be imposed upon the tractor and transmitted to the outer end of the pinion are carried by the outboard bearing and transmitted equally to the ends of the sprocket wheel axle because the outboard bearing supports the pinion at the place of its greatest load and substantially intermediate the points of support of the sprocket axle and intermediate the vertical plates composing the side frame members.

From the foregoing it will be appreciated that I have attained not only those objects specifically mentioned above, but many other objects too numerous to be mentioned. The rear creeper sprocket is securely mounted in the truck frame of the tractor. The sprocket thrust bearing, because of its construction into separable parts, permits the choice of high grade dissimilar metals, the separable parts of the thrust bearings are locked to their adjacent members, the interior support for the axle of the sprocket and consequently the outboard bearing for the pinion is securely and rigidly fixed with respect to the frame member so that there can be relatively little, if any, play between the driving parts, the pinion and brake drum are not only rigidly secured together by the bolts connecting them, but are in addition keyed against relative rotation. the pinion and brake drum are securely and adjustably arranged on the short end of the driving axle so that the tractor mechanism may be applied to a ready built tractor power plant unit, the working parts are maintained in dust and dirt proof condition and the parts are so arranged and constructed that they may be easily and quickly asembled and taken apart by practically unskilled labor. All of these features contribute to the qualities desirable as well as the qualities necessary in a structure of this class.

While the invention has been described in its preferred form and arrangement, it will be obvious that its essential characteristics may be embodied in many devices bearing little, if any, resemblance to the illustrated form and for such reason I do not desire to be limited by the showing but only by the spirit of the invention and the scope of the appended claims.

I claim:

1. In a tractor in combination, a pair of spaced frame members, a stub shaft between said frame members and secured thereto at its ends, a wheel rotatably supported on said stub shaft by and between said frame members and having an internal gear connected thereto, a driven axle adjacent said member, a gear connected to said axle and engaged with said internal gear for driving said wheel, and a bearing for the outer end of said pinion supported on one of said frame members.

2. In combination with the live axle of a tractor and a pair of spaced side frame members, a sprocket wheel rotatably mounted on and between said frame members on an axis off center with respect to the axis of said live axle, reducing gearing including a gear secured on the end of said axle and projecting within said sprocket for driving said driving wheel from said axle, and means connected to and supported by one of said frame members and rotatably engaged with said gear between the gear and sprocket for supporting one end of said gear independently of the axle.

3. In combination with the live axle of a tractor and a pair of spaced frame members, a driving wheel rotatably connected to and mounted between said frame members, an internal gear on said wheel, a pinion gear secured to and overhanging the end of said axle at one end and engaging said internal gear thereat, and means for supporting the overhanging end of said pinion comprising a supporting member secured to one of said frame members and engaging said overhanging end concentrically with the axis of rotation thereof.

4. In combination with a live axle of a vehicle, a brake drum adjustably secured to said axle, a driven member, means removably secured to and adjustable with said brake drum for driving said driven member and having a portion extending beyond the end of said axle, and means independent of the axle and brake drum for supporting said driving means in part at its portion extending beyond the axle.

5. In a vehicle of the character described, supporting frame members, a driving wheel rotatably supported in part on said members, said wheel having a hub and a rim flange, means substantially permanently closing one side of said wheel between said hub and flange, a live axle extending toward said wheel on the side of the wheel opposite its permanently closed side and between said hub and flange, a driven gear on the interior of said flange, a driving gear meshing with said driven gear secured to said live axle and extending beyond the end thereof, an outboard bearing secured to said support providing a bearing for said driving gear at a place beyond the end of said live axle, and means connected to said bearing and substantially stationary with respect to said wheel for closing the other side of said wheel between said hub and flange.

6. In a vehicle of the character described, supporting frame members, a driving wheel rotatably supported in part on said members, said wheel having a hub and a rim flange, means substantially permanently closing one side of said wheel between said hub and flange, a live axle extending toward said wheel on the side of the wheel opposite its permanently closed side and between said hub and flange, a driven gear on the interior of said flange, a driving gear meshing with said driven gear secured to said live axle and extending beyond the end thereof, an outboard bearing connected to said support members providing a bearing for said driving gear at a place beyound the end of said live axle, and means connected to said bearing and substantially stationary with respect to said wheel for closing the other side of said wheel between said hub and flange, said last mentioned means being adjustable toward and from said flange.

In witness of the foregoing I affix my signature.

GEORGE C. JETT.